(12) United States Patent
Jung et al.

(10) Patent No.: US 12,431,541 B2
(45) Date of Patent: Sep. 30, 2025

(54) BATTERY CELL AND BATTERY MODULE

(71) Applicant: LG Energy Solution, Ltd., Seoul (KR)

(72) Inventors: Kitaek Jung, Daejeon (KR); Junyeob Seong, Daejeon (KR); Jee Hoon Jeong, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 741 days.

(21) Appl. No.: 17/616,062

(22) PCT Filed: Jun. 30, 2020

(86) PCT No.: PCT/KR2020/008548
§ 371 (c)(1),
(2) Date: Dec. 2, 2021

(87) PCT Pub. No.: WO2021/006529
PCT Pub. Date: Jan. 14, 2021

(65) Prior Publication Data
US 2022/0320588 A1 Oct. 6, 2022

(30) Foreign Application Priority Data

Jul. 9, 2019 (KR) .................. 10-2019-0082658

(51) Int. Cl.
*H01M 10/0585* (2010.01)
*H01M 50/105* (2021.01)
(Continued)

(52) U.S. Cl.
CPC ..... *H01M 10/0585* (2013.01); *H01M 50/105* (2021.01); *H01M 50/184* (2021.01); *H01M 50/124* (2021.01)

(58) Field of Classification Search
CPC ........... H01M 10/0585; H01M 50/105; H01M 50/184; H01M 50/124; H01M 50/186;
(Continued)

(56) References Cited

U.S. PATENT DOCUMENTS

2009/0311592 A1   12/2009   You et al.
2018/0138470 A1    5/2018   Park et al.
(Continued)

FOREIGN PATENT DOCUMENTS

CN   102245475 A   11/2011
CN   107851741 A    3/2018
(Continued)

OTHER PUBLICATIONS

International Search Report for PCTKR2020008548 dated Sep. 28, 2020, 2 pgs.
(Continued)

*Primary Examiner* — Helen Oi K Conley
(74) *Attorney, Agent, or Firm* — Lerner David LLP

(57) ABSTRACT

A battery cell with an electrode assembly and a pouch case is disclosed herein. The electrode assembly can include a positive electrode, a negative electrode, and a separator interposed therebetween. The electrode assembly can have a planar shape with four sides. The pouch case can accommodate the electrode assembly. The pouch case can include a first accommodating portion to accommodate a portion of the electrode assembly, a second accommodating portion to accommodate the remaining portion of the electrode assembly. A folding portion of the pouch case can be configured to fold the pouch case such that the first accommodating portion and the second accommodating portion face each other. The pouch case can include a seam allowance formed by boning an extension of a sealing portion of the pouch case to an extension of the folding portion at an intersection of the folding portion and the sealing portion.

9 Claims, 3 Drawing Sheets

(51) Int. Cl.
*H01M 50/184* (2021.01)
*H01M 50/124* (2021.01)

(58) Field of Classification Search
CPC ............. H01M 50/183; H01M 50/211; H01M 50/249; H01M 50/178; H01M 50/548; H01M 50/557; Y02E 60/10
See application file for complete search history.

(56) References Cited

U.S. PATENT DOCUMENTS

| | | |
|---|---|---|
| 2019/0027714 A1 | 1/2019 | Jung et al. |
| 2019/0237832 A1 | 8/2019 | Ju et al. |
| 2019/0305260 A1 | 10/2019 | Kim et al. |
| 2020/0067029 A1 | 2/2020 | Park et al. |
| 2020/0365836 A1 | 11/2020 | Jung et al. |
| 2021/0066676 A1 | 3/2021 | Jung et al. |
| 2021/0143498 A1 | 5/2021 | Lee et al. |
| 2022/0115687 A1 | 4/2022 | Choi et al. |

FOREIGN PATENT DOCUMENTS

| | | |
|---|---|---|
| CN | 108598296 A | 9/2018 |
| EP | 2356030 B1 | 8/2012 |
| EP | 3321991 A1 | 5/2018 |
| EP | 3561899 A1 | 10/2019 |
| JP | 2009533834 A | 9/2009 |
| KR | 20180018051 A | 2/2018 |
| KR | 20180029856 A | 3/2018 |
| KR | 20180085185 A | 7/2018 |
| KR | 20190010434 A | 1/2019 |
| KR | 20190024755 A | 3/2019 |
| KR | 20190066731 A | 6/2019 |
| WO | 2018117654 A1 | 6/2018 |
| WO | 2019121332 A1 | 6/2019 |

OTHER PUBLICATIONS

Extended European Search Report including Written Opinion for Application No. 20837002.3 dated Jul. 27, 2022, pp. 1-7.
Search Report dated Feb. 13, 2023 from the Office Action for Chinese Application No. 202080041565.8 issued Feb. 15, 2023, 2 pages. [See p. 1, categorizing the cited references].

BATTERY CELL AND BATTERY MODULE

CROSS-REFERENCE TO RELATED APPLICATION(S)

This application is a national phase entry under 35 U.S.C. § 371 of International Application No. PCT/KR2020/008548 filed on Jun. 30, 2020, which claims priority to and the benefit of Korean Patent Application No. 10-2019-0082658 filed in the Korean Intellectual Property Office on Jul. 9, 2019, the entire contents of which are incorporated herein by reference in their entirety.

TECHNICAL FIELD

The present invention relates to a battery cell and a battery module including the same, and more specifically, to a battery cell and a battery module including the same that may reduce a size of a battery module.

BACKGROUND ART

Rechargeable batteries having high application characteristics and electrical characteristics such as high energy density according to their products are widely applied to battery vehicles, hybrid vehicles, and electric power storage devices driven by electric driving sources, as well as portable devices. These rechargeable batteries are attracting attention as new energy sources for improving environmental friendliness and energy efficiency in that they do not generate any by-products of energy use, as well as their primary merit, that they can drastically reduce the use of fossil fuels.

One or a couple of battery cells per device are used for small mobile devices, whereas medium and large devices such as automobiles require high power/large capacity. Therefore, a medium or large-sized battery module with a plurality of battery cells electrically connected to each other is used.

In this case, the battery cells accommodated in the battery module are accommodated in a form of a stacked body of a plurality of battery cells, and as a size of one battery cell increases, a size of the stacked body increases, and accordingly, an entire size of the battery module increases. As such, when the size of the battery module is increased, there is a problem that an energy density is lowered. In addition, as a size of an unnecessary portion of the battery cell increases, a space between the battery cell stacked body and a frame of the battery module accommodating the same increases, resulting in additional costs for managing the unnecessarily increased space. Therefore, it is necessary to reduce the size of the battery cell stacked body accommodated in the battery module by reducing the unnecessary portion of the battery cell as much as possible.

DISCLOSURE

Technical Problem

The present invention has been made in an effort to provide a battery cell having a reduced size by removing an unnecessary portion of a battery cell only with a simple structure, and a battery module having improved space utilization by including a stacked body of such battery cells.

However, the objective of the present invention is not limited to the aforementioned one, and may be extended in various ways within the spirit and scope of the present invention.

Technical Solution

An embodiment of the present invention provides a battery cell including: an electrode assembly including a positive electrode, a negative electrode, and a separator interposed between the positive electrode and the negative electrode, and having a planar shape with four sides; and a pouch case in which the electrode assembly is accommodated, wherein the pouch case includes a first accommodating portion in which a portion of the electrode assembly is accommodated, a second accommodating portion in which the remaining portion of the electrode assembly is accommodated, and a folding portion that is able to be folded so that the first accommodating portion and the second accommodating portion face each other, the folding portion is formed in close contact along a side surface of the electrode assembly at one of the four sides, the first accommodating portion and the second accommodating portion are in contact with each other at portions corresponding to three sides excluding the folding portion along an outer periphery of the electrode assembly to form a sealing portion, and the pouch case includes a seam allowance portion formed by bonding an extension of the sealing portion to an extension surface of the folding portion at a crossing portion of the folding portion and the sealing portion.

The sealing portion and the seam allowance portion may form a T shape in a cross-section perpendicular to a thickness direction of the electrode assembly.

The extension surface of the folding portion may not protrude in an outer direction of the sealing portion.

The extension surface of the folding portion may be positioned on the same surface as the side surface of the electrode assembly.

The seam allowance portion may have a symmetrical shape based on the sealing portion.

The electrode assembly may include an electrode lead connected to the positive electrode or the negative electrode, and the electrode lead may be drawn out to the outside of the sealing portion at one side perpendicular to one side of the electrode assembly on which the folding portion is formed.

The pouch case may be made of a sheet-like base material in which the first accommodating portion, the second accommodating portion, the folding portion, and the seam allowance portion are integrally formed.

The sealing portion and the seam allowance portion may form an arrow shape in a cross-section perpendicular to a thickness direction of the electrode assembly.

Another embodiment of the present invention provides a battery module including: a battery cell stacked body formed by stacking a plurality of the battery cells; and a frame accommodating the battery cell stacked body.

Another embodiment of the present invention provides a battery pack including: at least one battery module; and a pack case packaging the at least one battery module.

Another embodiment of the present invention provides a device including at least one battery pack.

Advantageous Effects

According to the embodiments, it is possible to realize a battery cell having a reduced size by not causing an unnecessary volume increase of the battery cell without adding a complicated process and a battery module with an improved space utilization rate by including a stacked body of such battery cells.

MODE FOR INVENTION

Figure 1:
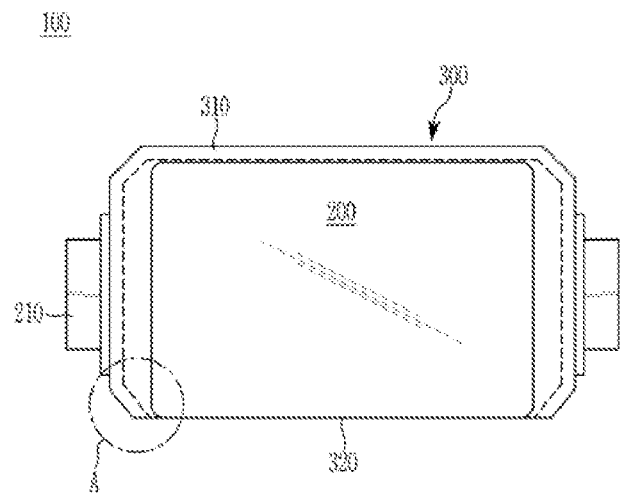
FIG. 1 illustrates a battery cell according to an embodiment of the present invention.

The present invention will be described more fully hereinafter with reference to the accompanying drawings, in which embodiments of the invention are shown. As those skilled in the art would realize, the described embodiment may be modified in various different ways, all without departing from the spirit or scope of the present invention.

In order to clearly describe the present invention, parts or portions that are irrelevant to the description are omitted, and identical or similar constituent elements throughout the specification are denoted by the same reference numerals.

Further, in the drawings, the size and thickness of each element are arbitrarily illustrated for ease of description, and the present disclosure is not necessarily limited to those illustrated in the drawings. In the drawings, the thicknesses of layers, films, panels, regions, areas, etc., are exaggerated for clarity. In the drawings, for ease of description, the thicknesses of some layers and areas are exaggerated.

It will be understood that when an element such as a layer, film, region, area, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, throughout the specification, the phrase "in a plan view" or "on a plane" means viewing a target portion from the top, and the phrase "in a cross-sectional view" or "on a cross-section" means viewing a cross-section formed by vertically cutting a target portion from the side.

Hereinafter, a battery module according to an embodiment of the present invention will be described with reference to FIG. 1 to FIG. 4.

Figure 2:
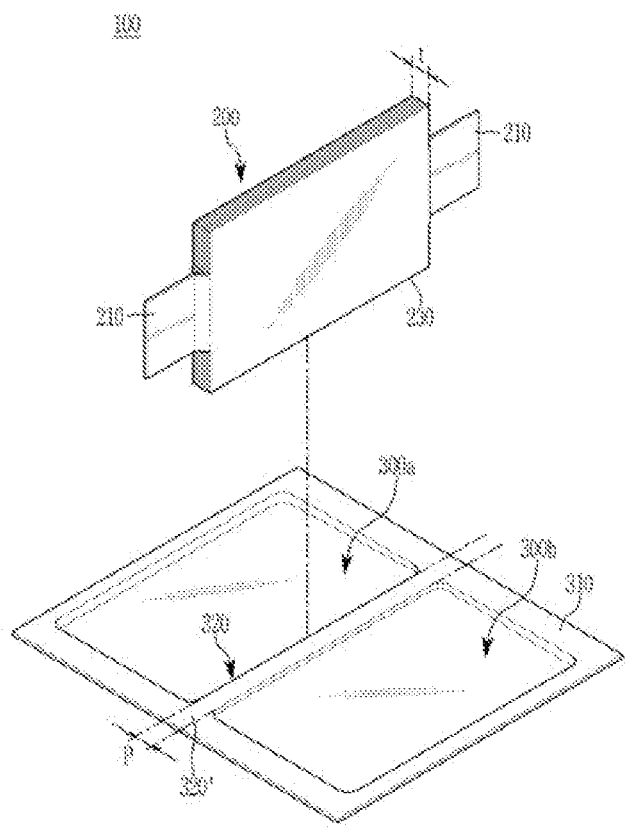
FIG. 2 illustrates an exploded state of an assembly step of the battery cell of FIG. 1.
Figure 3A:
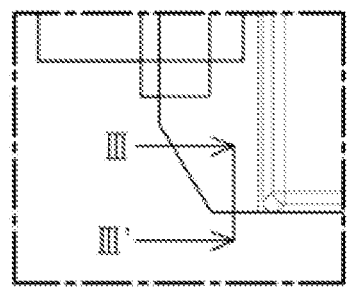
FIG. 3A illustrates an enlarged view of portion A of FIG. 1.
Figure 3B:
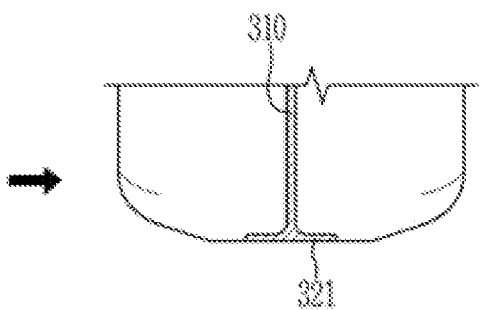
FIG. 3B illustrates a cross-section taken at line III-III of FIG. 3A.
Figure 4A:
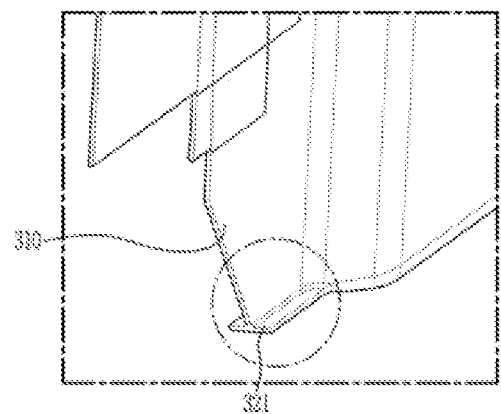
FIG. 4A illustrates a perspective view of portion A of FIG. 1 in a first direction.
Figure 4B:
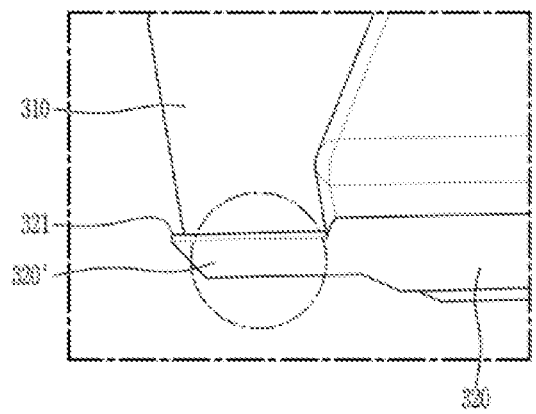
FIG. 4B illustrates a perspective view of portion A of FIG. 1 in a second direction.

FIG. 1 illustrates a battery cell according to an embodiment of the present invention, FIG. 2 illustrates an exploded state of an assembly step of the battery cell of FIG. 1, FIGS. 3A and 3B illustrate an enlarged view and a cross-sectional view of portion A of FIG. 1, and FIGS. 4A and 4B illustrate additional views of portion A of FIG. 1.

Referring to FIG. 1 and FIG. 2, a battery cell 100 according to the present embodiment is a secondary battery, and may be configured as a pouch-type of secondary battery. The battery cell 100 may include an electrode assembly 200, a pouch case 300, and an electrode lead 210 protruding from the electrode assembly 200.

The electrode assembly 200 may be a stacked electrode assembly in which a plurality of positive and negative electrodes cut in units of a predetermined size are sequentially stacked with a separator interposed therebetween, but is not limited thereto, and it may be a wound electrode assembly in which a structure in which positive electrodes and negative electrodes with a separator interposed therebetween are stacked and wound.

The electrode lead 210 may be electrically connected to the electrode assembly 200. The electrode leads 210 may be provided as a pair. Portions of the pair of electrode leads 210 may protrude to the outside of the pouch case 300 from the front and rear sides (both end portions in a longitudinal direction of the electrode assembly) of the pouch case 300, respectively. The configuration of the battery cell 100 described above is an example, and the shape of the battery cell 100 may be variously modified.

The pouch case 300 is made of a sheet-like base material that includes a first accommodating portion 300a and a second accommodating portion 300b, and a folding portion 320 positioned between the first accommodating portion 300a and the second accommodating portion 300b. A portion of the electrode assembly 200 is accommodated in the in first accommodating portion 300a, and the remaining portion of the electrode assembly 200 is accommodated in the second accommodating portion 300b, and the first accommodating portion 300a and the second accommodating portion 300b are folded so that they face each other with the folding portion 320 therebetween, so that the electrode assembly 200 may be accommodated to be surrounded.

In this case, the electrode assembly 200 has a planar shape having four sides, the folding portion 320 is positioned at a portion corresponding to one of the four sides such that the folding portion 320 is in close contact with a side surface 230 of the electrode assembly 200. The sheet-like base material is then folded at both edges of the folding portion 320, so that the folding portion 320 may be folded so that the first accommodating portion 300a and the second accommodating portion 300b face each other. Therefore, a width (P) of the folding portion 320 may be the same as a thickness (t) of the electrode assembly 200 as best shown in FIG. 2.

Three sides of pouch case 300, excluding the side corresponding to the folding portion 320, including edges of the first accommodating portion 300a and the second accommodating portion 300b contact each other to form a sealing portion 310. The sealing portion 310 is sealed by a method such as thermal fusion.

In more detail, the sheet-like base material of the pouch case 300 may be made of a laminate sheet including a metal layer and a resin layer. Particularly, the laminate sheet may be an aluminum laminate sheet. The sheet-like base material includes a core portion made of a metal layer, a thermal-fusion layer formed on one surface of the core portion, and an insulating film formed on the other surface of the core portion. The thermal-fusion layer may act as an adhesive layer by using modified polypropylene, which is a polymer resin, for example, casted polypropylene (CPP), and the insulating film may be made of a resin material such as nylon or polyethylene terephthalate (PET), but the structure and material of the pouch case are not limited to these examples. In the sealing portion 310, the thermal-fusion layers of the first accommodating portion 300a and the second accommodating portion 300b come into contact with each other, and the pouch case 300 is sealed by performing a thermal-fusion process in a state in which they contact each other. After sealing, as shown in FIG. 1, an excess portion of the portion in contact with the electrode lead 210 may be diagonally cut, but the present invention is not limited thereto.

As described above, in the process of sealing by using the sheet-like base material, in the portion where the folding portion 320 and the sealing portion 310 intersect (portion A in FIG. 1), in order to prevent a portion protruding to the outside of one side of the electrode assembly 200 on which the folding portion 320 is formed while the sheet-like base material is pressed from occurring, in the embodiment of the present invention, the sealing portion 310 is spread in a side direction and an extension of the sealing portion 310 is adhered to an extension surface 320' of the folding portion 320 to form a seam allowance portion 321.

Figure 5:
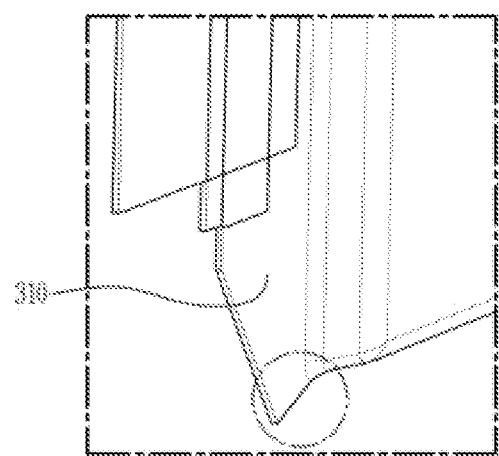
FIG. 5 illustrates a comparative example.

That is, in the prior art, as shown in FIG. 5, while the pouch case is pressed in a direction in which the sealing portion is compressed during the sealing process, a bur-shaped protrusion called a bat ear is formed in a direction toward the outside of the side surface of the electrode assembly. This protrusion makes it impossible to compact the cell, and forms an unnecessary space to limit cell capacity, which lowers an energy density in the battery module/pack and has disadvantages in a cooling structure.

However, according to the embodiment of the present invention, since it includes the structure of the seam allowance portion 321 bonded to the extension surface 320' of the folding portion 320 by spreading the sealing portion 310 to the side, it is possible to prevent the pouch case 300 from protruding to the outside of the side 230 of the electrode assembly 200.

In this case, the extension surface 320' of the folding portion 320 to which the extension of the sealing portion 310 is attached is not protruded in an outer direction of the sealing portion 310 as shown in FIGS. 4A and 4B. That is, the folding portion 320 extends on the same plane as the side surface 230 of the electrode assembly 200 to form the extension surface 320' to not protrude in the outer direction of one side corresponding to the side surface 230 of the electrode assembly 200. Since the extension of the sealing portion 310 is attached to the extension surface 320' formed described above while being laterally spread, the sealing portion 310 and the seam allowance portion 321 form a T shape in a cross-sectional view as shown in the cross-sectional view of FIG. 3B. In addition, the seam allowance portion 321 is formed in a symmetrical shape based on the sealing portion 310.

According to this configuration, changing the folding direction of the sealing portion 310 during the sealing process prevents a protrusion shape such as a bat ear protruding to the outside of the side surface 230 of the electrode assembly 200. It is possible to prevent a step from occurring at the side surface of the battery cell 100. Accordingly, the size of the battery cell 100 may be reduced, and thus the height of the battery cell stacked body formed by stacking the battery cells 100 upright may be reduced, and accordingly, since even the height of the battery module formed by accommodating the battery cell stacked body in the frame may be reduced, it is possible to increase the energy density of the battery module. In addition, as the space between the battery cell 100 and the frame is reduced, an amount of a heat dissipation resin injected into the corresponding space may be reduced as well, and thus a cost reduction effect may be obtained.

A configuration according to another embodiment of the present invention will be described with reference to FIGS. 6A and 6B.

Figure 6A:
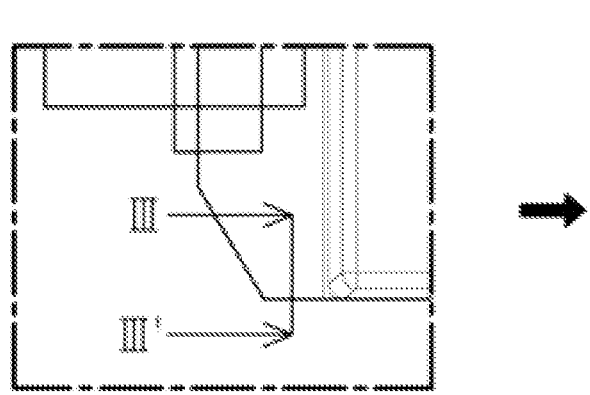
FIG. 6A illustrates an enlarged view of the portion A of FIG. 1 according to another embodiment.
Figure 6B:
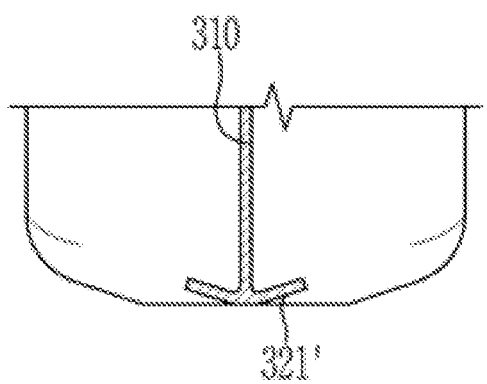
FIG. 6B illustrates a cross-section taken at line III-III of FIG. 6A.

FIGS. 6A and 6B illustrate an enlarged view and a cross-sectional view according to another embodiment of the portion A of FIG. 1.

As shown in FIGS. 6A and 6B, a seam allowance portion 321' according to another embodiment of the present invention is further folded inward from the extension surface of the folding portion 320, and thus cross-sections of the seam allowance portion 321' and the sealing portion 310 may be formed to have an arrow shape. Even with this configuration, since the seam allowance portion 321' does not protrude outwardly from the side surface of the electrode assembly 200, the technical idea of the present invention may be achieved. That is, as long as the seam allowance portion 321' does not protrude outwardly, even if it is protruded in the direction of the extension surface 320' of the folding portion 320 or even if it is folded to the upper portion of the folding portion 320, since the volumes of the battery cell 100 and the battery cell stacked body formed by the stacking the battery cells are not increased, the configuration of the seam allowance portion 321' may be variously modified within this range.

Meanwhile, the battery cells according to the embodiment of the present invention may form the battery cell stacked body formed by stacking a plurality of battery cells in an upright state, and the battery cell stacked body may be accommodated in the frame to form the battery module.

In addition, one or more battery modules according to the embodiment of the present invention may be packaged in a pack case to form a battery pack.

The battery cell, the battery module, and the battery pack including the same described above may be applied to various devices. These devices may be applied to a vehicle such as an electric bicycle, an electric vehicle, or a hybrid vehicle, but the present invention is not limited thereto, and may be applied to various devices that can use a battery module and a battery pack including the same, and this is also included in the scope of the present invention.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

100: battery cell
200: electrode assembly
210: electrode lead
300: pouch case
310: sealing portion
320: folding portion
321: seam allowance portion

The invention claimed is:

1. A battery cell comprising:
   an electrode assembly including a positive electrode, a negative electrode, and a separator interposed therebetween, the electrode assembly having a planar shape with four sides; and
   a pouch case, the electrode assembly being accommodated in the pouch case, the pouch case including a first accommodating portion in which a portion of the electrode assembly is accommodated, a second accommodating portion in which the remaining portion of the electrode assembly is accommodated, and a folding portion configured to fold the pouch case such that the first accommodating portion and the second accommodating portion face each other, the folding portion contacting one side of the electrode assembly, the first accommodating portion and the second accommodating portion being in contact with each other adjacent three sides of the electrode assembly excluding the folding portion along an outer periphery of the electrode assembly to form a sealing portion,
   wherein the pouch case includes a seam allowance portion formed by bonding an extension of the sealing portion to an extension surface of the folding portion at an intersection of the folding portion and the sealing portion,
   wherein the sealing portion and the seam allowance portion form a T shape cross-section perpendicular to a thickness of the electrode assembly, the seam allowance portion being positioned inward of an outermost boundary of the sealing portion such that the seam allowance portion does not protrude outwardly from a side surface of the electrode assembly,
   wherein the extension surface of the folding portion does not extend away from the sealing portion.

2. The battery cell of claim 1, wherein the extension surface of the folding portion and one of the side surfaces of the electrode assembly lie on a common plane.

3. The battery cell of claim 1, wherein the seam allowance portion has a symmetrical shape about the sealing portion.

4. The battery cell of claim 1, wherein the electrode assembly includes an electrode lead connected to the positive electrode or the negative electrode, the electrode lead extending outside the sealing portion at one side perpendicular the folding portion.

5. The battery cell of claim 1, wherein the pouch case is made of a base material sheet in which the first accommodating portion, the second accommodating portion, the folding portion, and the seam allowance portion are integrally formed.

6. A battery module comprising:
   a battery cell stacked body formed by stacking a plurality of the battery cells according to claim 1; and
   a frame accommodating the battery cell stacked body.

7. A battery pack comprising:
   at least one battery module according to claim 6; and
   a pack case packaging for the at least one battery module.

8. A device comprising at least one battery pack according to claim 7.

9. A battery cell comprising:
   an electrode assembly including a positive electrode, a negative electrode, and a separator interposed therebetween, the electrode assembly having a planar shape with four sides; and
   a pouch case, the electrode assembly being accommodated in the pouch case, the pouch case including a first accommodating portion in which a portion of the electrode assembly is accommodated, a second accommodating portion in which the remaining portion of the electrode assembly is accommodated, and a folding portion configured to fold the pouch case such that the first accommodating portion and the second accommodating portion face each other, the folding portion contacting one side of the electrode assembly, the first accommodating portion and the second accommodating portion being in contact with each other adjacent three sides of the electrode assembly excluding the folding portion along an outer periphery of the electrode assembly to form a sealing portion,
   wherein the pouch case includes a seam allowance portion formed by bonding an extension of the sealing portion to an extension surface of the folding portion at an intersection of the folding portion and the sealing portion,
   wherein the sealing portion and the seam allowance portion form an arrow shape in a cross-section perpendicular to a thickness of the electrode assembly,
   wherein the extension surface of the folding portion does not extend away from the sealing portion.

* * * * *